United States Patent
Bunio et al.

(10) Patent No.: US 10,989,322 B2
(45) Date of Patent: Apr. 27, 2021

(54) PNEUMATIC MULTI-VALVE DEVICE AND PRODUCTION METHOD

(71) Applicant: ETO Magnetic GmbH, Stockach (DE)

(72) Inventors: Mariusz Bunio, Zerniki Male (PL); Witold Bruczuk, Wroclaw (PL); Michael Zinser, Orsingen-Nenzingen (DE)

(73) Assignee: ETO Magnetic GmbH, Stockach (DE)

( * ) Notice: Subject to any disclaimer, the term of this patent is extended or adjusted under 35 U.S.C. 154(b) by 95 days.

(21) Appl. No.: 16/094,522

(22) PCT Filed: Feb. 3, 2017

(86) PCT No.: PCT/EP2017/052382
§ 371 (c)(1),
(2) Date: Oct. 18, 2018

(87) PCT Pub. No.: WO2017/182150
PCT Pub. Date: Oct. 26, 2017

(65) Prior Publication Data
US 2019/0120396 A1    Apr. 25, 2019

(30) Foreign Application Priority Data
Apr. 18, 2016 (DE) ............... 10 2016 107 161.7

(51) Int. Cl.
*F16K 27/00* (2006.01)
*F16K 27/02* (2006.01)
(Continued)

(52) U.S. Cl.
CPC .......... *F16K 27/003* (2013.01); *F16K 27/029* (2013.01); *F16K 27/0263* (2013.01);
(Continued)

(58) Field of Classification Search
CPC ............. F15B 13/0835; F15B 13/0871; F16K 27/003; F16K 27/029; F16K 27/10;
(Continued)

(56) References Cited

U.S. PATENT DOCUMENTS 4,341,241 A * 7/1982 Baker ................. F16K 37/0041
137/554
4,578,662 A * 3/1986 Slavin ................. F16K 31/0631
137/625.65
(Continued)

FOREIGN PATENT DOCUMENTS

DE      1196917 B     7/1965
DE      10224732 A1   10/2003
(Continued)

OTHER PUBLICATIONS

International search report for patent application No. PCT/EP2017/052382 dated May 24, 2017.

*Primary Examiner* — Seth W. MacKay-Smith
(74) *Attorney, Agent, or Firm* — Bachman & LaPointe, PC

(57) ABSTRACT

A pneumatic multi-valve device includes a housing (21) having a plurality of electromagnetic valve actuators (1), each having coil elements (2) arranged stationary in the housing (21), a core (4) arranged in the housing (21), and armature elements (24). The cores (4) each have a venting bore (5) connected to a venting collection channel (14) on the side of the cores (4) facing away from the connection housing side (23). The venting collection channel is connected to a venting opening (28) of the housing (21), which venting opening is arranged on a housing side different from the housing back side (25). The venting collection channel (14) is formed by a plurality of venting channel elements (13), which are connected to each other.

19 Claims, 5 Drawing Sheets

(51) Int. Cl.
*F16K 31/06* (2006.01)
*F15B 13/08* (2006.01)

(52) U.S. Cl.
CPC ...... *F16K 31/0606* (2013.01); *F16K 31/0651* (2013.01); *F16K 31/0675* (2013.01); *F15B 13/0835* (2013.01)

(58) Field of Classification Search
CPC .... F16K 27/102; F16K 27/12; F16K 31/0606; F16K 31/0651; F16K 31/0675
USPC .............................. 137/883, 884; 251/129.21
See application file for complete search history.

(56) References Cited

U.S. PATENT DOCUMENTS

| | | | | |
|---|---|---|---|---|
| 4,678,006 A | * | 7/1987 | Northman | F16H 61/0009 137/596.17 |
| 4,687,137 A | * | 8/1987 | Boger | B05C 5/001 118/315 |
| 4,768,559 A | * | 9/1988 | Hehl | G05D 23/1919 137/887 |
| 4,785,848 A | * | 11/1988 | Leiber | B60T 8/363 137/596.17 |
| 4,998,559 A | * | 3/1991 | McAuliffe, Jr. | F16H 61/0251 137/596.17 |
| 5,127,434 A | * | 7/1992 | Kline | B60H 1/00642 137/596.17 |
| 5,474,108 A | * | 12/1995 | Inden | B60T 8/368 137/270 |
| 6,644,353 B1 | * | 11/2003 | Eidsmore | F15B 13/0807 137/884 |
| 6,966,338 B2 | * | 11/2005 | Flynn | F01L 9/02 137/596.17 |
| 7,320,339 B2 | * | 1/2008 | Milburn | F16K 27/003 137/884 |
| 8,235,067 B2 | * | 8/2012 | Gagne | F16K 7/06 137/606 |
| 8,267,375 B1 | | 9/2012 | Lahousse | |
| 8,397,763 B2 | * | 3/2013 | deGreef | A61G 7/05776 137/883 |
| 8,539,979 B2 | * | 9/2013 | Frank | B60T 8/362 137/315.11 |
| 2007/0273462 A1 | * | 11/2007 | Stehle | H01F 7/08 335/14 |
| 2009/0114865 A1 | | 5/2009 | Homann et al. | |
| 2010/0038571 A1 | | 2/2010 | Frank et al. | |
| 2012/0266987 A1 | * | 10/2012 | Jaasma | F02D 19/0684 137/602 |
| 2013/0318954 A1 | | 12/2013 | Frank et al. | |
| 2015/0053290 A1 | * | 2/2015 | Hamm | F16K 27/003 137/884 |
| 2016/0053901 A1 | * | 2/2016 | Kim | F16K 11/24 137/565.16 |
| 2017/0018345 A1 | * | 1/2017 | Raff | F16K 31/0675 |

FOREIGN PATENT DOCUMENTS

| | | |
|---|---|---|
| DE | 10311239 B3 | 11/2004 |
| DE | 102013113673 A1 | 6/2015 |

\* cited by examiner

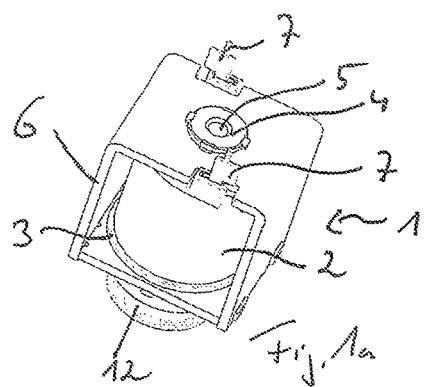
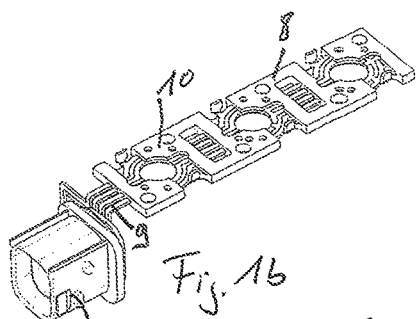
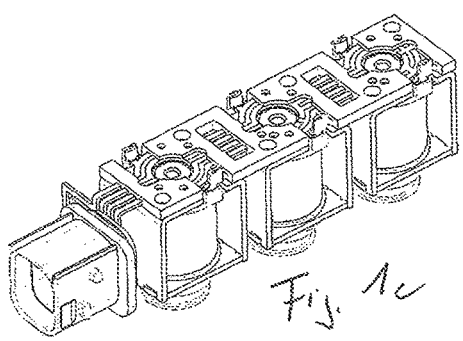
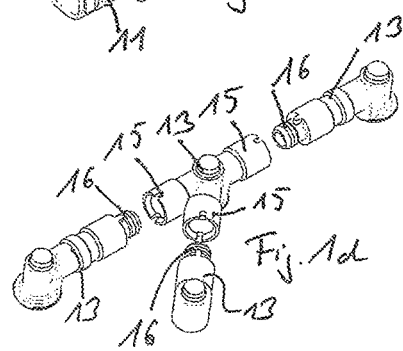
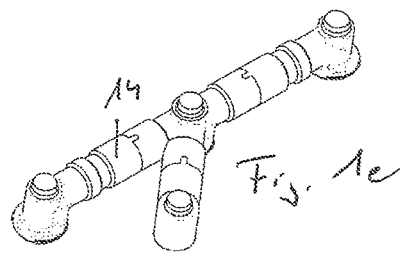
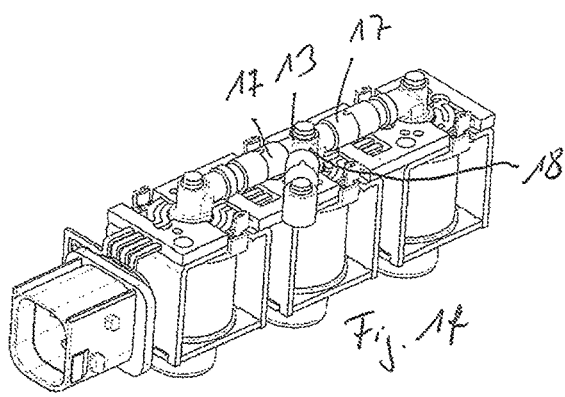
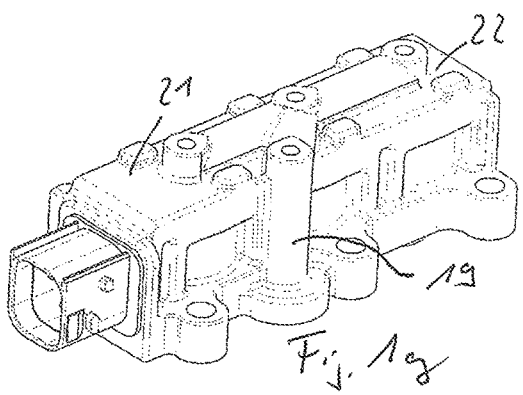
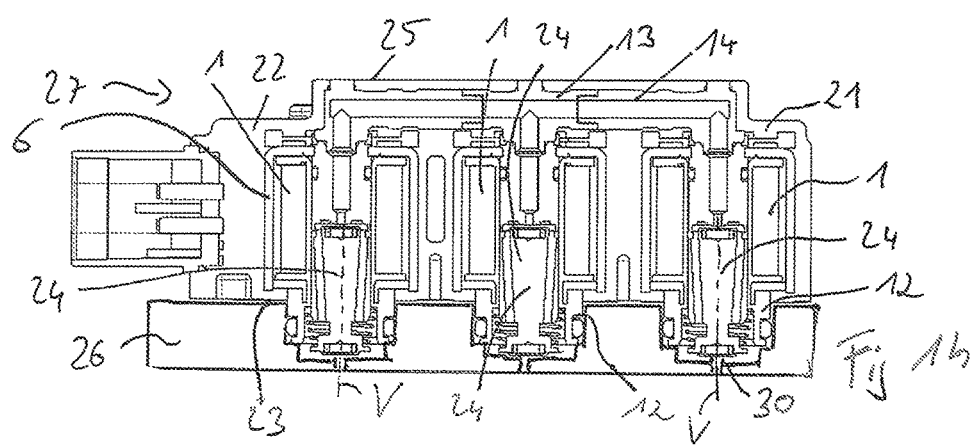

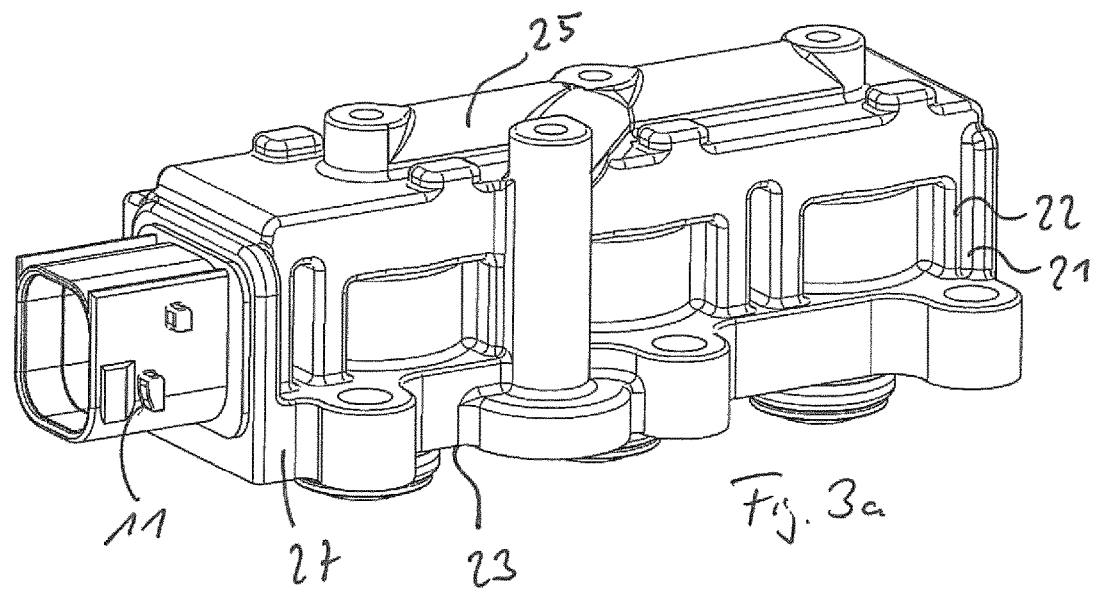
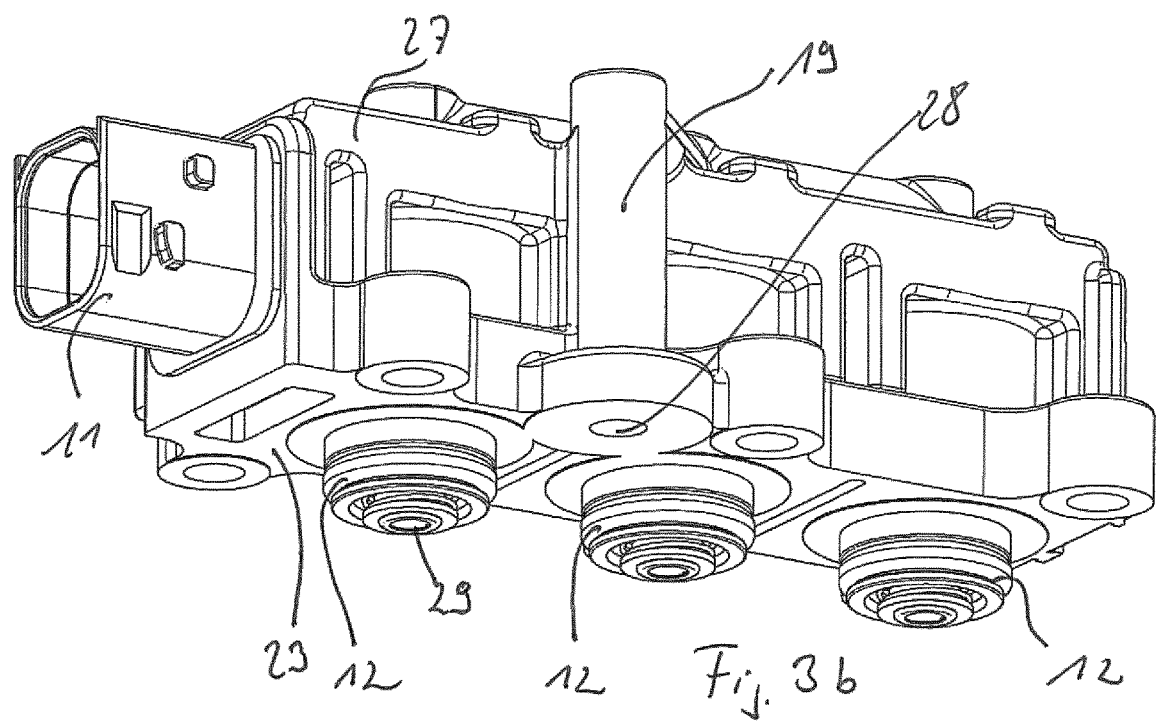

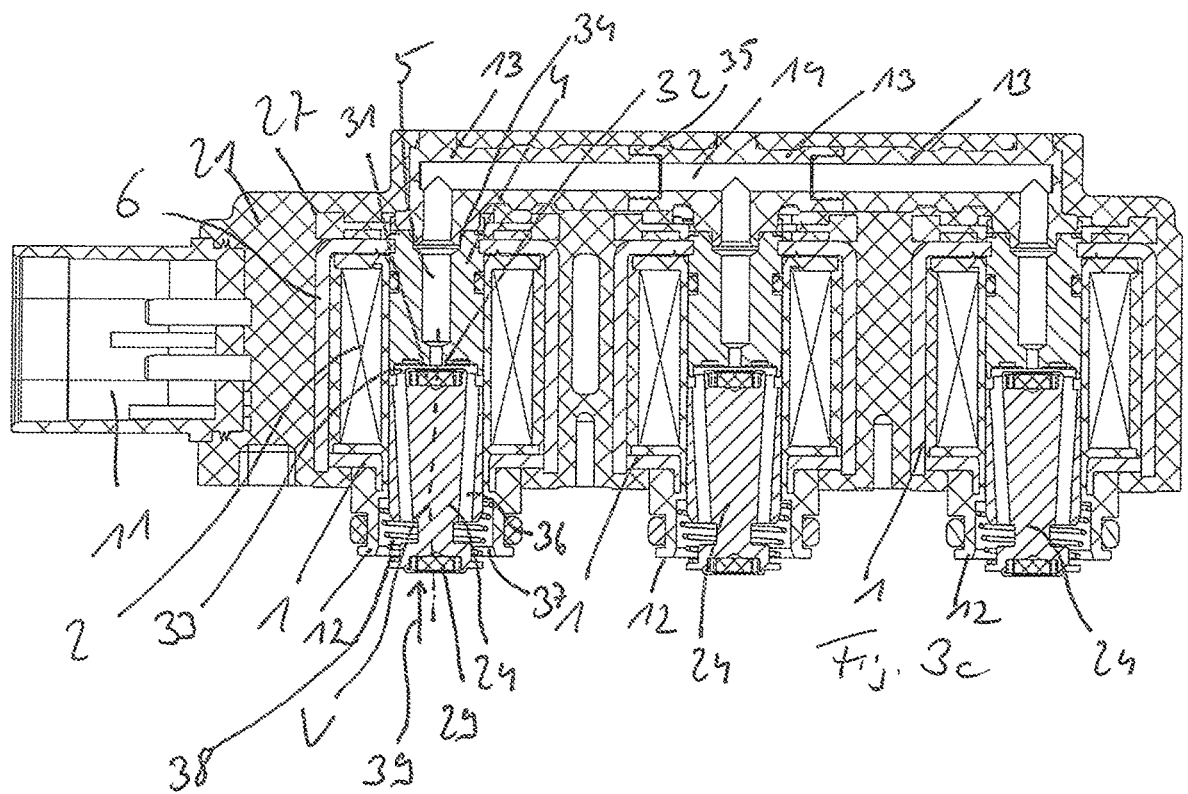
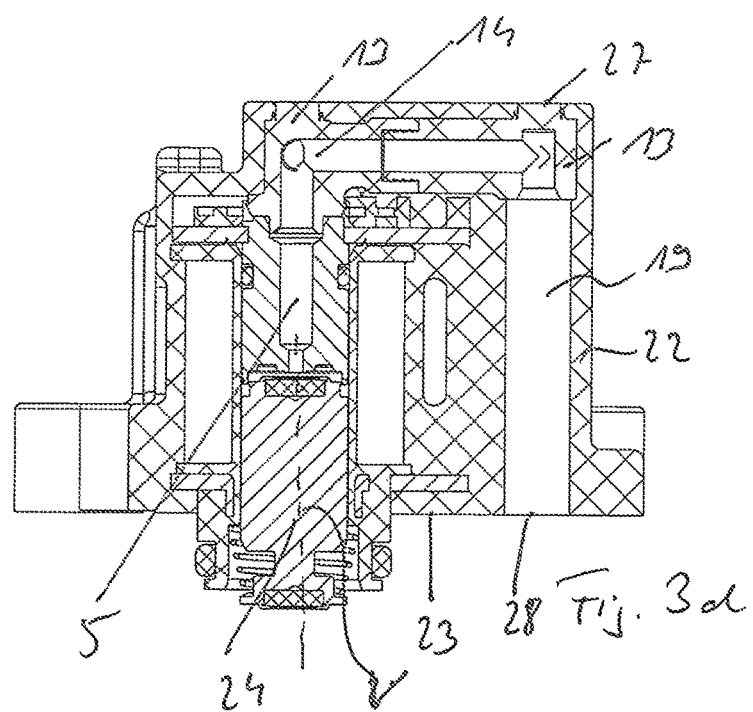

PNEUMATIC MULTI-VALVE DEVICE AND PRODUCTION METHOD

BACKGROUND OF THE INVENTION

The invention relates to a pneumatic multi-valve device (valve block), in particular for use in electronically regulated air spring systems of vehicles, preferably utility vehicles, comprising a housing, which has a plurality of electromagnetic valve actuators, each having coil elements arranged in the housing in a stationary manner, a core arranged in the housing, and armature elements, which can be displaced along a displacement axis in the housing relative to the core and to a (respective) pneumatic connection of the housing as a response to energization of the coil elements, wherein the displacement axes of the armature elements of the (plurality of) valve actuators are oriented parallel and the pneumatic connections associated with the armature elements are arranged adjacent to each other on a connection housing side (of the housing), which is spaced apart from a housing back side facing away therefrom along the displacement axes, wherein the cores each have a venting bore, which is connected in an air-conducting manner to a venting collection channel on the side of the cores facing away from the connection housing side, which venting collection channel is connected in an air-conducting manner to a venting opening of the housing, which venting opening is arranged on a housing side different from the housing back side, in particular on the connection housing side having the pneumatic connections.

The invention further relates to a method for producing such a multi-valve arrangement.

Known multi-valve devices (valve blocks) are used in the context of electronically regulated air spring systems for utility vehicles. In the case of the known multi-valve arrangements, the armature elements of the different valve actuators interact with a respective valve seat arranged outside of the housing in a distributor plate connected to the housing, in order to open and to close the connection from a compressed air line to a working line in the context of the air spring application. The individual valves or valve actuators, respectively, are vented via venting bores, which are provided in the armature elements and which, on a pneumatic connection side (connection housing side) of the housing back side facing away from the housing, which is connected to the distributor plate, lead into a collection area or collection channel, respectively, which is bounded by a cover, which is screwed to the housing and which is characterized accordingly in a three-dimensional manner to embody the collection channel.

The venting air flows from the collection channel to a venting opening on the connection housing side via a housing-side venting channel parallel to the displacement axes of the actuator elements. The guiding of the armature elements takes place in armature guide tubes, which are accommodated the coil carrier of the coil elements of the valve actuators.

The extensive manufacturing process is perceived to be disadvantageous in the case of the known multi-valve devices, because the housing has to be produced in a two-stage overmolding process. The reason for this is that the coil carriers, together with a wire mesh arrangement for electrically contacting the coil elements, are initially overmolded and the unit of various coil elements produced in this way is accommodated in a joint carrier yoke, which clasps the various coil elements, whereupon the carrier yoke and already overmolded coil elements or the coil element unit, respectively, are or is overmolded again, respectively. The housing produced in this way is then screwed on the back side to the cover in order to form the venting collection channel or area, respectively, and is connected to the distributor plate on the pneumatic connection side. In addition, the required amount of copper for forming the coil elements is relatively high.

SUMMARY OF THE INVENTION

Based on the above-mentioned prior art, the invention is based on the object of specifying a pneumatic multi-valve device, which can be produced more easily and in the case of which a cover for bounding the venting collection channel can preferably be forgone. The used amount of copper for forming the coil elements (with equal or higher displacement force of the armature elements) is to preferably be reduced as well. The object is further to specify a simplified production method for a multi-valve device according to the invention.

With regard to the pneumatic multi-valve device, this object is solved by means of the features disclosed herein, i.e. in the case of a generic multi-valve device, in that the venting collection channel is formed by a plurality of venting channel elements, which are connected to each other in an air-conducting manner and which are preferably each embodied as plastic injection molded part, or is comprised of them, respectively.

With regard to the method, the object is solved by means of the features disclosed herein, i.e. in the case of a generic method, in that the venting bores of the cores are each connected in an air-conducting manner to a venting channel element, which is preferably embodied as plastic injection molded part, which had been or are connected, respectively, in an air-conducting manner to a venting collection channel prior to or after the connection to the venting bores in an air-conducting manner.

Advantageous further developments of the invention are specified in the subclaims. All combinations of at least two features disclosed in the description, the claims and/or the Figures, fall within the scope of the invention. To avoid repetitions, features disclosed according to the device shall also apply as being disclosed according to the method and as being capable of being claimed. Features disclosed according to the method shall likewise also apply as being disclosed according to the device and as being capable of being claimed.

The invention is based on the idea of modularly assembling the venting collection channel of a plurality of individual channel or venting channel elements, respectively, wherein each venting bore, which is arranged in one of the cores, is connected in an air-conducting manner to one of the venting channel elements, preferably in each case to its own venting channel element, wherein the venting channel elements, in turn, together form the venting collection channel, which then, preferably via a housing-side venting channel, leads to the housing side venting opening, which is arranged on a housing side, different from the housing back side, in particular the (pneumatic) connection housing side of the preferably essentially cuboidal housing. In other words, a venting pipe system is formed with the help of a plurality of venting channel elements, preferably by inserting the venting channel elements into each other, which venting pipe system contacts the venting bores of the cores in an air-conducting manner. A housing cover, which is necessary in the prior art, for bounding the venting collection channel, can be forgone in this way. In particular, it is furthermore possible, as will be described later, to integrate the venting channel elements in a monolithic housing body, which is to be produced by means of overmolding, and to thus ensure an increased mechanical stability. The modular venting collection channel setup according to the invention also makes it possible to connect the various components of the multi-valve device by means of a single overmolding process, in particular in connection with the embodiment of a single monolithic housing body, in particular because the individual valve actuators can be or are positioned, respectively, relative to each other so as to be defined via a plurality of venting channel elements.

The venting channel elements are preferably located on a side of the cores, which faces away from the connection housing side, thus between the cores and the housing back side located opposite the connection housing side or facing away therefrom, respectively.

It turned out to be particularly advantageous when the individual venting channel elements are embodied as plastic injection molded parts, which will be or are modularly joined, respectively, to form the venting collection channel. Regardless of the material selection, the venting channel elements each form a channel section of the entire venting pipe system, wherein each of the venting channel elements preferably comprises at least one connection channel section to the associated core or the associated venting bore, respectively, as well as at least one connection channel section for connecting to another one of the venting channel elements in an air-conducting manner.

As already suggested, it is particularly preferred when the housing of the multi-valve arrangement has a, preferably monolithic, plastic housing body, or even more preferably consists thereof, wherein the plastic housing body is formed by overmolding the venting channel elements, preferably together with the coil elements, with plastic. The pneumatic connections associated with the armature elements are preferably fixed in the housing on the connection side facing away from the back side of the housing, in particular for securing a valve plate, which is preferably provided and which has valve seats for interacting with the armature elements, particularly preferably by means of partial overmolding.

As will be described later in connection with the method according to the invention, it is preferred when the plastic housing body, which encompasses or covers, respectively, the venting channel elements in the area of the housing back side, is the only overmolding housing body, which accommodates the venting channel elements and which, however, additionally also extends into areas between the coil elements, which are preferably each clasped by a yoke element, which is then enclosed by the plastic material of the monolithic plastic housing body. An electrical connector plug or an electrical connector socket for electrically contacting all of the coil elements is preferably located on a lateral housing wall or on a side of the plastic housing body, respectively, which extends in an angular manner, preferably at a right angle, to the connection side and the housing back side along the displacement axes. These electrical connection elements are preferably fixed in the, in particular only monolithic plastic housing body by means of overmolding, like the pneumatic connections on the connection housing side.

The venting collection channel, which consists of a plurality of venting channel elements, preferably does not directly connect the venting bores to the venting opening of the housing, but said venting opening is connected indirectly to the venting collection channel, which consists of the venting channel elements, via a housing-side venting channel, which preferably extends parallel to the displacement axes towards the connection housing side.

As also already suggested, the venting channel elements preferably serve for a relative positioning of the cores and thus of the coil elements, which accommodate the cores, prior to an overmolding process. To ensure the necessary mechanical stability and/or the air-conducting connection of the venting channel elements among one another, it is preferred when the venting channel elements can be inserted into each other or are inserted into each other, respectively, in particular in the manner of a socket joint. In addition or in the alternative, locking elements, which are embodied integrally or monolithically with the venting channel elements, respectively, can be associated for forming a mechanical locking connection.

It is particularly advantageous when the venting channel elements are or will be, respectively, connected mechanically to the cores by insertion into a respective core opening or by attaching to a respective connection appendage. An embodiment of one of the venting channel elements as branching element is particularly advantageous, which has a connection channel section for connection to one of the cores, at least one connection channel section for linking to another one of the venting channel element leading to another one of the cores, as well as a deflection channel section for the air-conducting connection to the venting opening, in particular to a housing-side venting channel, which leads to the venting opening.

In the case that more than two valve actuators are provided, it is preferred when the venting channel element, which is embodied as connection element, does not only have one connection channel section, but two connection channel sections for linking to two adjacent venting channel elements.

With regard to a simplified assembly, it is preferred when the venting channel elements permeate a joint electrical connection plate for electrically contacting the plurality of coil elements, preferably axially in extension of the displacement axes. Such a connection plate is preferably located on the side of the coil elements facing away from the connection housing side, wherein it is particularly preferred when the connection plate will be or is attached, respectively, to magnetically conducting yoke elements of the individual coil elements.

To save copper for the coil elements, it is preferred when armature guide tubes for guiding the armature elements in response to their displacement movement along the respective displacement axis are forgone and the armature elements are guided directly in a centrical passage opening of a respective coil carrier, in particular a plastic injection molded part. The distance of the armature elements to the coil elements is reduced thereby and a material transition is also saved.

The venting bores in the cores are preferably embodied as axial passage channels, which run in a straight line in extension of the displacement axes. Each core preferably comprises a centrical venting bore, which runs axially in a straight line and which is aligned with the displacement axis.

It turned out to be particularly advantageous that, with the corresponding core, the armature elements each bound a working chamber, which can be vented via the corresponding venting bore into the venting collection channel, which is formed by the venting channel elements.

The coil carriers are preferably each embodied in one piece with a pneumatic connection, which axially permeates the housing, in particular the monolithic housing body on the connection housing side in extension of the displacement axis of the armature. To connect the pneumatic connection area in an air-conducting manner to the corresponding venting bore in the core, it is preferred when a connection channel is provided, which is associated with the respective armature elements and which connects the pneumatic connection, in particular a working line, in an air-conducting manner to the associated venting bore, in particular via a working chamber, which is embodied between the armature elements and the core. The above-mentioned connection channel is preferably realized as bore embodied inside the armature elements. In addition or in the alternative, a connection channel can be realized on the outer circumference of the armature elements, which is preferably bounded directly by the coil carrier radially on the outside. It turned out to be particularly advantageous to associate a venting valve seat, which is associated with the assigned venting bore, with the armature elements for closing the respective venting bore, preferably by energizing the coil elements. The armature elements preferably interact with a front side sealing element held therein, in particular an elastomeric element with the core-side venting valve seat. Regardless of the concrete embodiment of the pairing armature elements/ venting valve seat, it is preferred when the armature elements can be displaced against the spring force of a return spring when energizing the coil elements, wherein it is particularly preferred when the spring elements apply a spring force to the armature elements away from the venting valve seat, so that the working area, which is preferably bounded by the armature elements and the core, and which is preferably connected in an air-conducting manner to the connection area via a an armature-side connection channel and is vented in response to non-energization.

The armature elements preferably interact directly with a working valve seat, in particular via sealing elements, which are fixed thereto, more preferably which are elastomeric, which is preferably arranged on a side facing away from the respective connection valve seat, i.e. in the area of the connection housing side. More preferably, the working valve seats are not arranged in the monolithic plastic housing body, but inside a distributor plate, which is connected to the housing via the pneumatic connections. Preferably at least one pressure supply line, in particular a joint pressure supply line for all valve actuators, runs in the distributor plate, wherein the valve actuators open or close an opening between the at least one pressure supply line and an, in particular respective working line, by direct or indirect interaction of the armature elements with the working valve seat. An above-mentioned, preferably provided return spring is preferably arranged in such a way that this connection is or remains automatically closed in the case of non-energization of the coil elements.

The invention also leads to a method for producing a multi-valve arrangement, which is embodied according to the concept of the invention. As part of the method, a plurality of coil elements each comprising a core arranged therein is provided, wherein each core has a venting bore. According to the invention, the venting bores of the cores are each connected in an air-conducting manner to an, in particular separate venting channel element, which is more preferably embodied as plastic injection molded part. In the case of the finished multi-valve device, the venting channel elements form the venting collection channel. The connection of the venting channel elements to the venting channel can be realized after the connection of the venting channel elements to the venting bores or preferably beforehand, whereby it is possible to provide venting channel elements, which have already been connected to a venting collection channel beforehand, i.e. venting channel elements, which have already been connected to the venting collection channel, so as to then be connected to the venting bores as preassembled venting collection channel.

To embody the venting collection channel, the venting channel elements are preferably inserted into each other and/or are interlocked with each other. The connection to the venting bores preferably takes place by means of inserting or attaching into corresponding core openings or to corresponding core protrusions.

As is disclosed in connection with the multi-valve arrangement, it is preferred when the venting collection channel elements are overmolded, preferably together with the coil elements and the yoke elements arranged around them. It is possible thereby to connect the venting bores to the individual venting channel elements or, in the alternative, to the venting channel elements, which have already been assembled to form a collection channel, prior to the insertion into a plastic injection molding tool or, in the alternative, inside this tool.

In any event, the overmolding of the venting channel elements takes place, preferably together with the coil elements, in a corresponding plastic injection molding tool, wherein a single overmolding process is used for producing the housing for producing a single, monolithic housing body, which forms the housing.

BRIEF DESCRIPTION OF THE DRAWINGS

Further advantages, features and details of the invention follow from the following description of preferred exemplary embodiments as well as by means of the Figures.

FIG. 1a to FIG. 1h show different manufacturing stages for producing a multi-valve device shown in section in FIG. 1h, FIG. 2a to FIG. 2d show an alternative exemplary embodiment of a multi-valve arrangement embodied according to the concept of the invention, in different, partially sectional views, and FIG. 3a to FIG. 3d show an exemplary embodiment of a multi-valve arrangement according to FIGS. 1a to 1h in different, partially sectional views.

The same elements and elements with the same function are identified with the same reference numerals in the Figures.

DETAILED DESCRIPTION

Figure 2A:
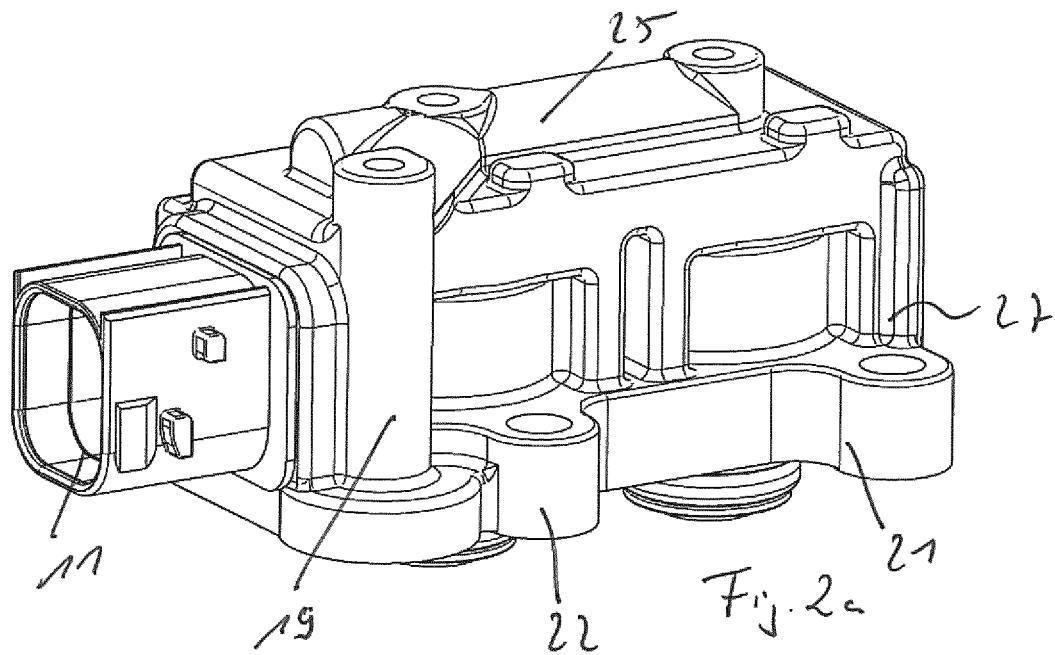

FIGS. 1a to 1f show different assembly steps and components for producing a multi-valve device according to the invention, which is illustrated in FIG. 1g in a perspective view and which, in turn, is illustrated in a sectional view in FIG. 1h.

FIG. 1a shows a preassembled, electromagnetic valve actuator 1, of which a plurality—here for example three pieces—is provided in the finished multi-valve device (valve block) illustrated in FIGS. 1g and 1h. The electromagnetic valve actuator 1 comprises energizable coil elements 2 (electrical winding), which is arranged on a coil carrier 3, which is embodied as plastic injection molded part. A core 4 for the electromagnetic interaction with non-illustrated armature elements is located in a central passage opening (central bore) of the coil carrier 3. A central venting bore 5 is provided in the core 4. The coil elements 3 are clasped by a magnetically conducting yoke 6 for closing the magnetic circuit. Electrical contact elements 7 for energizing or electrically contacting, respectively, the coil elements 2 can be seen. A pneumatic connection 12 for pneumatically contacting the valve actuator 1 is shown in FIG. 1a on the bottom in the drawing plane.

A plurality of such valve actuators, here for example three, is provided in the context of the production method. A connection plate 8 for electrically contacting the contacts 7 of a plurality of valve actuators 1 is shown in FIG. 1b. The connection plate 8 consists of conducting areas 9 as well as flanging sections 10 for fixing a plurality of, here three, valve actuators 1. The connection plate 8 comprises electrical connection elements 11, here in the form of a contact bushing.

FIG. 1c shows the next assembly or production step, respectively. It can be seen that the plurality of valve actuators 1 is arranged on the connection plate 8, which extends perpendicular to the displacement axes of the armature elements, which will be explained later. A plurality of venting channel elements 13, which are each embodied as plastic injection molded part, is shown in FIG. 1d, which are combined to form a venting collection channel 14 shown in FIG. 1e, in the present case by inserting into each other. For this purpose, at least one of the venting channel elements, here the central venting channel element in the drawing, which is embodied as distributor element, has end-sided connecting sleeve sections 15, for accommodating an insertion section 16 each of another one of the venting channel elements 13. The venting channel elements are connected in an air-conducting manner to the venting channel element 14 via this insertion connection. In the context of the method, it is possible to embody this intermediate assembly step for creating the venting channel element to be upstream, and to then provide the finished or pre-assembled venting channel 14, respectively. According to FIG. 1f, said venting channel is connected to the venting bores 5 of the cores, here by insertion into an insertion opening of each core on the front side. It can be seen that the exemplary central venting channel element 13 here according to FIG. 1f is embodied as distributor element and has two connection channel sections 17 for connection to the adjacent venting channel elements, as well as a discharge channel section 18 for connection to a connection channel section 20, which is oriented towards a housing venting channel 19 (see FIG. 1g) as well as downwards in the drawing, for linking to the associated core. The venting channel sections to the left and right of this distributor element are embodied in an essentially L-shaped manner and only have one connection channel section as well as one connection channel section.

The pre-assembly arrangement according to FIG. 1f is overmolded with plastic injection molding material to produce the housing 21 shown in FIG. 1g, which in the present case consists of a monolithic housing body 22, which is produced by means of the overmolding process and in which the functional units are embodied and from which electrical connection elements 11 protrude laterally. As can be seen from the sectional view according to FIG. 1h, the housing 21 or the housing body, respectively, comprises a connection housing side 23, from which the pneumatic connections 12 of the individual valve actuators 1 protrude, and a back side 25, which is spaced apart therefrom via displacement axes of armature elements 24 and at which the plastic injection molding material or the housing body, respectively, covers the venting channel elements 13 at least for the most part. A distributor plate for pneumatically contacting the pneumatic connections 12 is fixed or arranged, respectively, on the housing 21 on the connection housing side 23.

The detailed setup of the multi-valve device 27 according to FIG. 1h will be described below by means of FIGS. 3a to 3d, wherein, to avoid repetitions, reference is also made to the preceding Figure description, which applies in this regard.

The multi-valve device 27, which is embodied as three-way valve arrangement here, is shown in FIGS. 3a and 3b in different perspective views.

The monolithic housing body 22 can be seen, which forms the housing 21, which has the housing back side 25 and, located opposite thereto or facing away therefrom, respectively, the connection housing side 23 with its connections 12. The venting channel 19, which is produced by means of the mentioned overmolding process and which extends parallel to the displacement axes of the armature elements, which will be described later, and which leads to a venting opening 28 on the connection housing side 23, can be seen in FIGS. 3a and 3b.

The inner setup of the multi-valve arrangement 27 becomes clear from FIGS. 3c and 3d. First of all, the plurality of valve actuators 1, which are arranged adjacent to each other, can be seen, each comprising armature elements 24, which can be displaced axially along a respective displacement axis V and which interact with each other via a preferably elastomeric sealing element 29, which is on the bottom in the drawing plane and is held on the armature elements 24, in the area of the respective pneumatic connection 12 with a respective valve seat 30 (see FIG. 1h), the distributor plate 26 (see also FIG. 1h) in an area outside of the housing 21.

On the opposite side along the displacement axis V or facing away from the sealing element 29, respectively, the armature elements each support a further elastomeric sealing element 31 for interacting with a respective venting valve seat 32 on the core 4. By attaching the upper sealing element in the drawing plane to the venting valve seat 32, the venting bore 5 can be closed in the core 4. In the case of armature elements, which are displaced away from the venting valve seat 32, a working area 33 formed axially between the armature elements 24 and the core is connected in an air-conducting manner via the venting bore 5 to the venting collection channel 14, which, in turn, is formed by the venting channel elements 13.

They are inserted in corresponding depressions 34 in the cores 4 and are connected among each other in an air-conducting manner and mechanically in a respective connection area 35 by means of insertion.

Connection channels 36, which extend along the respective displacement axis V and which are embodied at a slight incline here in an exemplary manner, are embodied in the armature elements as passage openings or bores, respectively, which connect the respective pneumatic connection 12, more precisely a working line 37, which is provided at that location, to the working area 33 in an air-conducting manner.

A return spring 38, against the spring force of which the armature elements 14 can be displaced in response to energization, i.e. upwards in the drawing plane here, pushes the armature elements 24 downwards in the drawing plane against the (lower valve seat), which is not illustrated in FIG. 13, which serves to close a compressed air line (supply line), which is suggested via the arrow 39. If the coil elements 2 are not energized, the return spring 38 pushes the armature elements 24 against the lower valve seat, so that the air-conducting connection between the supply line and the working line is interrupted. The working line is simultaneously vented via the connection channels 36, the working area 13, and the venting bore 5. As a response to energization of the coil elements, the armature elements 24 are displaced away from the lower valve seat against the venting valve seat 32, whereby the venting is interrupted or the venting bore 5 is closed, respectively.

It can be seen from an overall view of FIGS. 3c and 3d that the monolithic housing body 22 encloses the venting valve elements 13 and furthermore also extends into areas between the valve actuators 1. The venting channel 19, to which the venting collection channel 14 is connected, is embodied in the housing body 22. The venting opening 28 is located on the connection housing side 23.

Figure 2B:
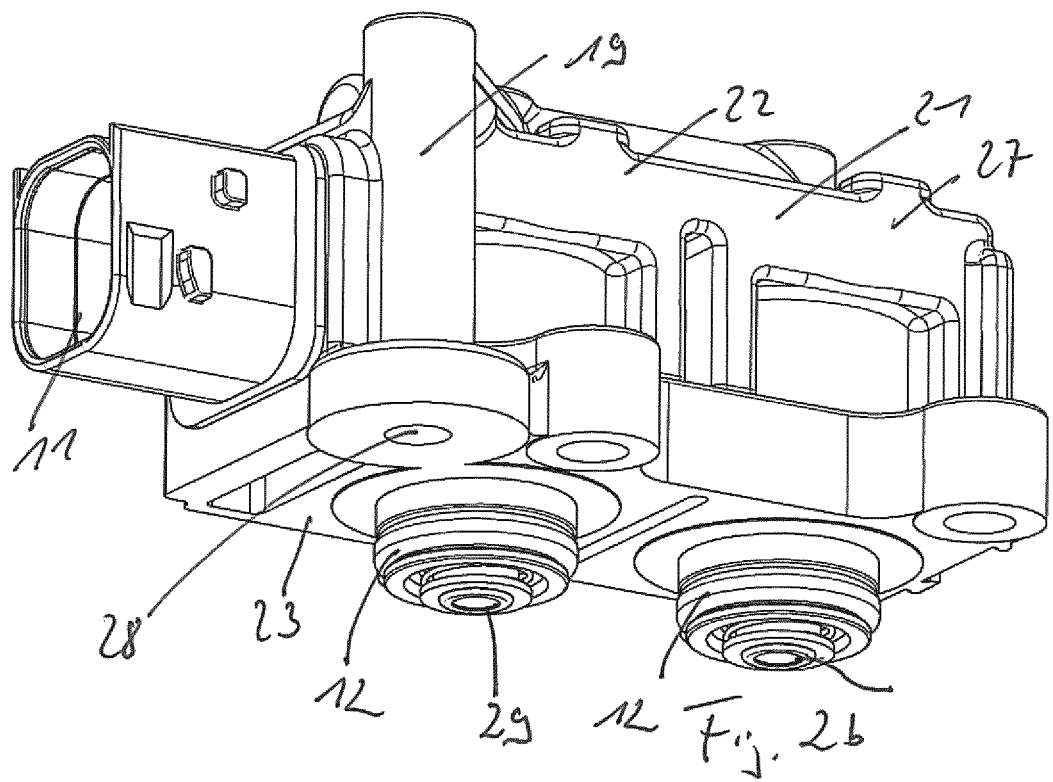
Figure 2C:
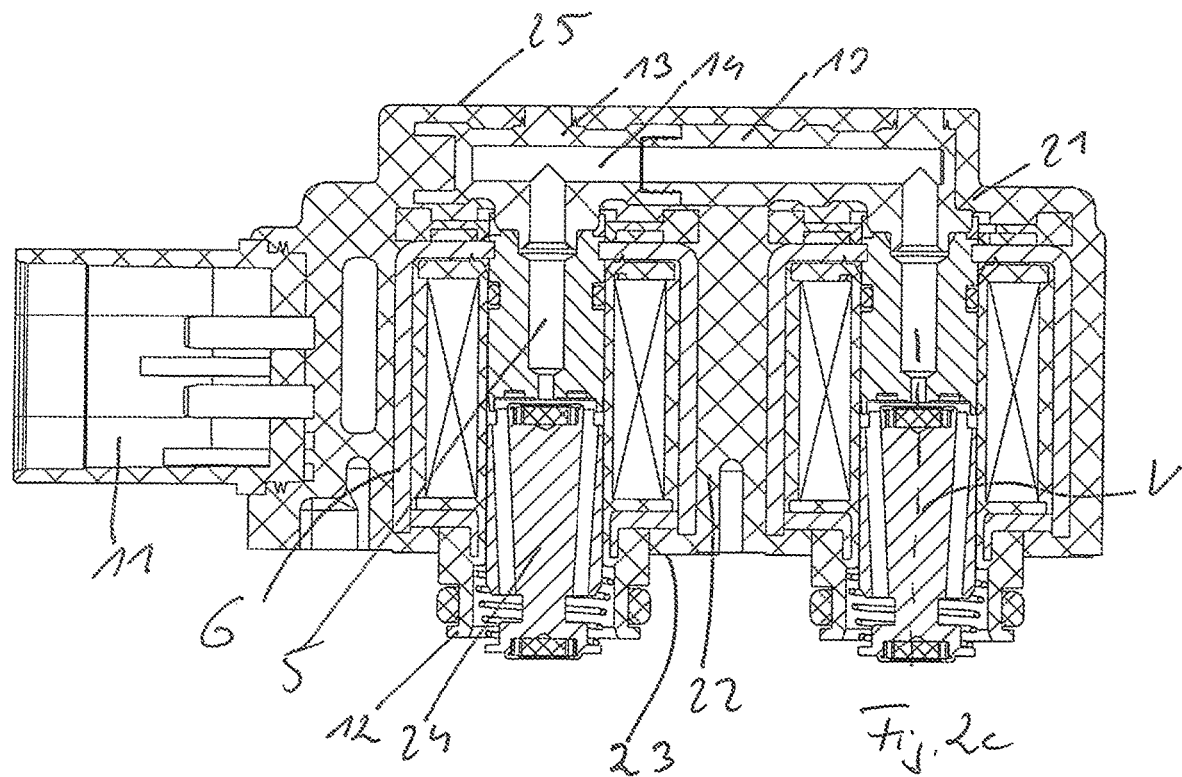
Figure 2D:
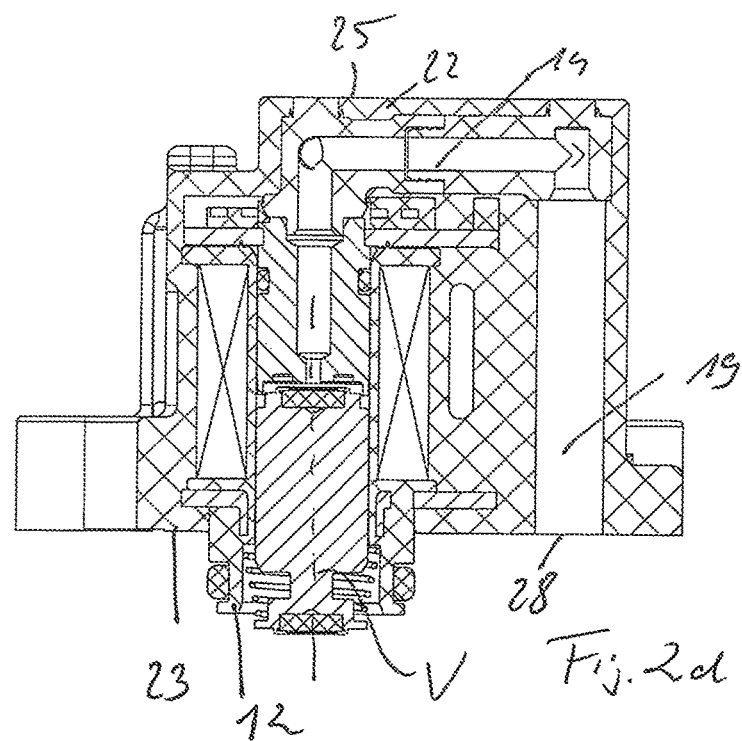

The multi-valve arrangement 27 according to FIGS. 2a to 2d has basically functionally the same setup, wherein only exclusively two valve actuators are arranged adjacent to each other here instead of three valve actuators. To avoid repetitions, reference is made to the preceding Figure description with regard to the predominant commonalities.

REFERENCE NUMERALS 1 electromagnetic valve actuator
2 coil element
3 coil carrier
4 cores
5 venting bores
6 yokes
7 electrical contacts
8 connection plate
9 conducting areas
10 flanging sections
11 electrical connection elements
12 pneumatic connections
13 venting channel elements
14 venting collection channel
15 connecting sleeve sections
16 insertion sections
17 connection channel sections
18 discharge channel section
19 venting channel
20 connection channel section
21 housing
22 housing body
23 connection housing side
24 armature elements
25 housing back side
26 pneumatic distributor plate
27 multi-valve device
28 venting opening
29 sealing element
30 (working) valve seat
31 sealing element
32 venting valve seat
33 working area (working chamber)
34 depressions in the cores
35 connection area
36 connection channels
37 working line
38 return spring
39 arrow (symbolized by the pneumatic supply line)
V displacement axis

The invention claimed is:

1. A pneumatic multi-valve device, (valve block), comprising a housing (21), which has a plurality of electromagnetic valve actuators (1), each having coil elements (2) arranged in the housing (21) in a stationary manner, a core (4) arranged in the housing (21), and armature elements (24), which can be displaced along a displacement axis (V) in the housing (21) relative to the core (4) and to a pneumatic connection (12) of the housing (21) as a response to energization of the coil elements (2), wherein the displacement axes (V) of the armature elements (24) of the valve actuators (1) are oriented parallel and the pneumatic connections (12) associated with the armature elements (24) are arranged adjacent to each other on a connection housing side (23), which is spaced apart from a housing back side (25) facing away therefrom along the displacement axes (V), wherein the cores (4) each have a venting bore (5), which is connected in an air-conducting manner to a venting collection channel (14) on the side of the cores (4) facing away from the connection housing side (23), which venting collection channel is connected in an air-conducting manner to a venting opening (28) of the housing (21), which venting opening is arranged on a housing side different from the housing back side (25), the housing side being the connection housing side (23) having the pneumatic connections (12), wherein the venting collection channel (14) has a longitudinal axis and is formed by a plurality of venting channel elements (13) connected to each other and distributed along the longitudinal axis of the venting collection channel (14), wherein the plurality of venting channel elements (13) are connected to each other in an air-conducting manner.

2. The multi-valve device according to claim 1, wherein the housing (21) has a monolithic housing body (22) which is formed by overmolding the venting channel elements (13), together with the coil elements (2), with plastic.

3. The multi-valve device according to claim 2, wherein a venting channel, which extends parallel to the displacement axes (V) and which connects the venting collection channel (14) to the venting opening (28), which is formed by a venting channel end of the venting channel (19), is embodied in the housing body (22).

4. The multi-valve device according to claim 1, wherein the venting channel elements (13) are mechanically connected to each other, in a positive manner, and/or wherein the venting channel elements (13) are mechanically connected to the cores (4).

5. The multi-valve device according to claim 4, wherein the venting channel elements (13) are mechanically connected to each other in a positive manner by inserting into each other and/or interlocking with each other, and/or wherein the venting channel elements (13) are mechanically connected to the cores (4) by means of inserting or attaching into or onto the cores (4), respectively.

6. The multi-valve device according to claim 1, wherein one of the venting channel elements (13) is embodied as branching element, which has a connection channel section (20) for connection to one of the cores (4), at least one connection channel section (17) for linking to another one of the venting channel elements (13) leading to another one of the cores (4), as well as a deflection channel section for the air-conducting connection to the venting opening (28).

7. The multi-valve device according to claim 1, wherein at least some of the venting channel elements (13) permeate a joint electrical connection plate (8) for electrically contacting the plurality of coil elements (2), axially in extension of the displacement axes (V).

8. The multi-valve device according to claim 1, wherein the armature elements (24) are each guided directly in one of the coil carriers (3), which are embodied as plastic part, of the associated coil elements (2) in a longitudinally displaceable manner, without interpositioning an armature guide tube.

9. The multi-valve device according to claim 1, wherein the venting bores (5), which are centrically arranged in the cores (4), run axially in a straight line and/or are parallel among each other and/or wherein a respective working chamber (33), which can be vented via the associated venting bore (5), is bounded by each armature element (24) and the associated core (4).

10. The multi-valve device according to claim 1, wherein that the venting bores (5) are connected to the pneumatic connection (12) and/or a working line (37) via a respective connection channel (36), which leads into the respective working chamber (33).

11. The multi-valve device according to claim 10, wherein the respective connection channel (36) comprises at least one bore in the respective armature elements (24) and/or is embodied on the outer circumference of the armature elements (24).

12. The multi-valve device according to claim 1, wherein a venting valve seat (32), which is associated with the corresponding venting bore (5), is in each case associated with the armature elements (24) for closing the respective venting bore (5), by energizing the coil elements (2).

13. The multi-valve device according to claim 1, further comprising that a working valve seat (30), which is in each case associated with the armature elements (24) in the area of the pneumatic connection (12), for opening and closing an air-conducting connection between a pressure supply line and a working line.

14. The multi-valve device according to claim 1, wherein the housing (21) is connected via the pneumatic connections (12) to a distributor plate (26) having working valve seats (30) for interacting with the armature elements (24), at least one pressure supply line, and at least one working line.

15. The multi-valve device according to claim 1, wherein the plurality of venting channel elements (13) are each embodied as a plastic injection molded part.

16. A method for producing a multi-valve device (27) comprising a housing (21), which has a plurality of electromagnetic valve actuators (1), each having coil elements (2) arranged in the housing (21) in a stationary manner, a core (4) arranged in the housing (21), and armature elements (24), which can be displaced along a displacement axis (V) in the housing (21) relative to the core (4) and to a pneumatic connection (12) of the housing (21) as a response to energization of the coil elements (2), wherein the displacement axes (V) of the armature elements (24) of the valve actuators (1) are oriented parallel and the pneumatic connections (12) associated with the armature elements (24) are arranged adjacent to each other on a connection housing side (23), which is spaced apart from a housing back side (25) facing away therefrom along the displacement axes (V), wherein each core (4) has a venting bore (5), which is connected in an air-conducting manner to a venting collection channel (14) on the side of the core (4) facing away from the connection housing side (23), which venting collection channel is connected in an air-conducting manner to a venting opening (28) of the housing (21), which venting opening is arranged on a housing side different from the housing back side (25), the housing side being the connection housing side (23) having the pneumatic connections (12), wherein the venting collection channel (14) has a longitudinal axis and is formed by a plurality of venting channel elements (13) connected to each other along the longitudinal axis of the venting collection channel (14), wherein the plurality of venting channel elements (13) are connected to each other in an air-conducting manner, comprising:

providing the plurality of coil elements (2) each comprising the core (4) arranged therein and the venting bore (5), connecting each of the venting bores (5) of the cores (4) in an air-conducting manner to a venting channel element (13), and connecting the venting channel elements in an air-conducting manner to define the venting collection channel (14) prior to or after the connection of the venting channel element (13) to the venting bores (5) in an air-conducting manner.

17. The method according to claim 16, further comprising, to embody the venting collection channel (14), inserting the venting channel elements (13) into each other and/or interlocking the venting channel elements (13) with each other, and/or mechanically connecting the venting channel elements (13) to the cores (4), by inserting or attaching into the cores (4).

18. The method according to claim 16, further comprising overmolding the venting channel elements (13) together with the coil elements (2), to embody a monolithic housing body (22).

19. The method of claim 16, wherein the venting channel element (13) is a plastic injection molded part.

* * * * *